(12) United States Patent  (10) Patent No.: US 8,984,403 B2
Nissen et al.  (45) Date of Patent: Mar. 17, 2015

(54) BRINGING USER ATTENTION TO GUIDANCE INFORMATION PRESENTED ON A DISPLAY DEVICE

(75) Inventors: Oluf Nissen, Cupertino, CA (US); Marguerite Letulle, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2250 days.

(21) Appl. No.: 11/790,869

(22) Filed: Apr. 27, 2007

(65) Prior Publication Data

US 2008/0269919 A1    Oct. 30, 2008

(51) Int. Cl.
  *G06F 3/00*  (2006.01)
  *G06F 3/0481*  (2013.01)

(52) U.S. Cl.
  CPC .................................... *G06F 3/0481* (2013.01)
  USPC ............................ 715/705; 715/709; 715/710

(58) Field of Classification Search
  USPC .................................. 715/706–710, 714, 736
  See application file for complete search history.

(56) References Cited

U.S. PATENT DOCUMENTS

| | | | | |
|---|---|---|---|---|
| 6,161,126 A * | 12/2000 | Wies et al. | ..................... | 709/203 |
| 7,047,498 B2 * | 5/2006 | Lui et al. | ..................... | 715/762 |
| 2002/0118220 A1 * | 8/2002 | Lui et al. | ..................... | 345/709 |
| 2003/0103072 A1 * | 6/2003 | Ko | ..................... | 345/710 |
| 2004/0103148 A1 * | 5/2004 | Aldrich | ..................... | 709/204 |
| 2006/0048215 A1 * | 3/2006 | Brown et al. | ..................... | 726/7 |

* cited by examiner

*Primary Examiner* — Tuyetlien Tran
*Assistant Examiner* — Truc Chuong
(74) *Attorney, Agent, or Firm* — Jagtiani & Guttag

(57) ABSTRACT

The present invention provides methods and systems for bringing user attention to guidance information presented on a display device. These methods and systems comprise displaying guidance information in an initial animation mode, receiving a first user input in response to the displayed guidance information, determining whether the first user input satisfies validation criteria for responses to the guidance information, and displaying the guidance information in an altered animation mode when the first user input fails to satisfy the validation criteria.

24 Claims, 6 Drawing Sheets

500

| Input_name | Input_Type | Input_Len | Required |
|---|---|---|---|
| Bx1 | T/F | 1 | 0 |
| Bx2 | T/F | 1 | 0 |
| Bx3 | T/F | 1 | 0 |
| Bx4 | T/F | 1 | 0 |
| GroupNm | Char | 50 | 1 |

| ID | Verif_Name | Applies_To | Rule | Instr_Link |
|---|---|---|---|---|
| 0 | Sum_Checked_Box | Bx1 | Sum(Bx1, Bx2, Bx3, Bx4) < 3 | Instr_1 |
| 1 | Sum_Checked_Box | Bx2 | Sum(Bx1, Bx2, Bx3, Bx4) < 3 | Instr_1 |
| 2 | Sum_Checked_Box | Bx3 | Sum(Bx1, Bx2, Bx3, Bx4) < 3 | Instr_1 |
| 3 | Sum_Checked_Box | Bx4 | Sum(Bx1, Bx2, Bx3, Bx4) < 3 | Instr_1 |
| 4 | Length_Group_Nm | GroupNm | Len(GroupNm) <= 50 | Instr_2 |
| 5 | Length_Group_Nm | GroupNm | Len(GroupNm) > 0 | Instr_2 |

| ActionID | Instr | Action |
|---|---|---|
| A1 | Instr_1 | Font(size,+2) |
| A2 | Instr_1 | Font(Dual_Color, Yellow, Lime) |
| A3 | Instr_1 | Bounce(3) |
| A4 | Instr_1 | Tilt(left) |
| A5 | Instr_2 | Font(size,+1) |
| A6 | Instr_2 | Font(Dual_Color, Purple, Blue) |
| A7 | Instr_2 | Bounce(2) |

*FIG. 5C*

BRINGING USER ATTENTION TO GUIDANCE INFORMATION PRESENTED ON A DISPLAY DEVICE

BACKGROUND

1. Field of the Invention

The present invention relates generally to interactive software, and more particularly, to bringing user attention to guidance information presented on a display device.

2. Related Art

Computers and other interactive electronic devices equipped with displays and user input mechanisms are an increasingly prevalent and important part of people's lives. The technology implemented in such devices has advanced significantly in recent decades. The processing power of processors continues to double approximately every few years. The size and speed of volatile memory is constantly increasing while the cost of memory is constantly decreasing. The size and quality of display devices is also rapidly improving with time. These and other improvements to have resulted in more and more users having a wide range of computer expertise using computers in a wide range of activities.

Because many users of computers are not highly computer-trained individuals, there is an increasing demand for more capable and more user-friendly software to execute on interactive electronic devices. Exemplary interactive software includes, for example, Internet browser, record keeping, financial management, document drafting, and communication (e.g., e-mail and or instant messaging) software.

For interactive software which permits or requires user input, static mode (that is, non-changing) user instructions are often displayed to facilitate accurate user input. Commonly, the interactive software also determines whether the user input contains an error and, if so, provides similarly static information identifying the violated user instruction.

SUMMARY

In accordance with one aspect of the present invention, there is provided a method for bringing user attention to a region of a display containing guidance information, comprising displaying guidance information in an initial animation mode, receiving a user input in response to the displayed guidance information, determining whether the user input satisfies one or more corresponding validation criteria, and displaying the guidance information in an altered animation mode when the user input fails to satisfy the validation criteria.

BRIEF DESCRIPTION OF THE DRAWINGS

Embodiments of the invention are described below in conjunction with the accompanying drawings, in which:

FIG. 5A is a table defining user inputs, in accordance with an embodiment of the present invention;

FIG. 5B is a table defining validation criteria, in accordance with another embodiment of the present invention; and FIG. 5C is a table defining animation mode instructions, in accordance with another embodiment of the present invention.

DETAILED DESCRIPTION

Aspects of the present invention are generally directed to displaying guidance information which are selectively displayed in an initial animation mode or an altered animation mode based on the validity of user action or input. As used herein, the term "animation mode" refers to a state of visual activity, such as, for example, the visual state of an attribute of displayed guidance information (e.g., a user instruction). Such attributes include, for example, location, font type, font size, font color, the additional display of characters or images. States of activity include, for example, whether the attribute is changing or not, and if changing, how it is changing, how long it is to be changing, etc.

Exemplary animation modes include, for example, the displayed guidance information not being animated, the guidance information being animated to appear unchanged for a substantial period of time absent user input, the guidance information or a portion of same being animated to appear as jiggling or bouncing or rattling, the guidance information or portion of same being animated to appear as moving left to right, the guidance information or a portion of same being animated to appear as growing and/or shrinking, the guidance information or portion of same dynamically changing during the animation mode between at least a first set of one or more colors and a second set of one or more colors, the guidance information or portion of same being animated to have moving graphics or symbols moving near or overlapping the guidance information, the guidance information being animated to appear as having moving and/or cartoon-like features not normally associated with display element, etc.

Figure 1:
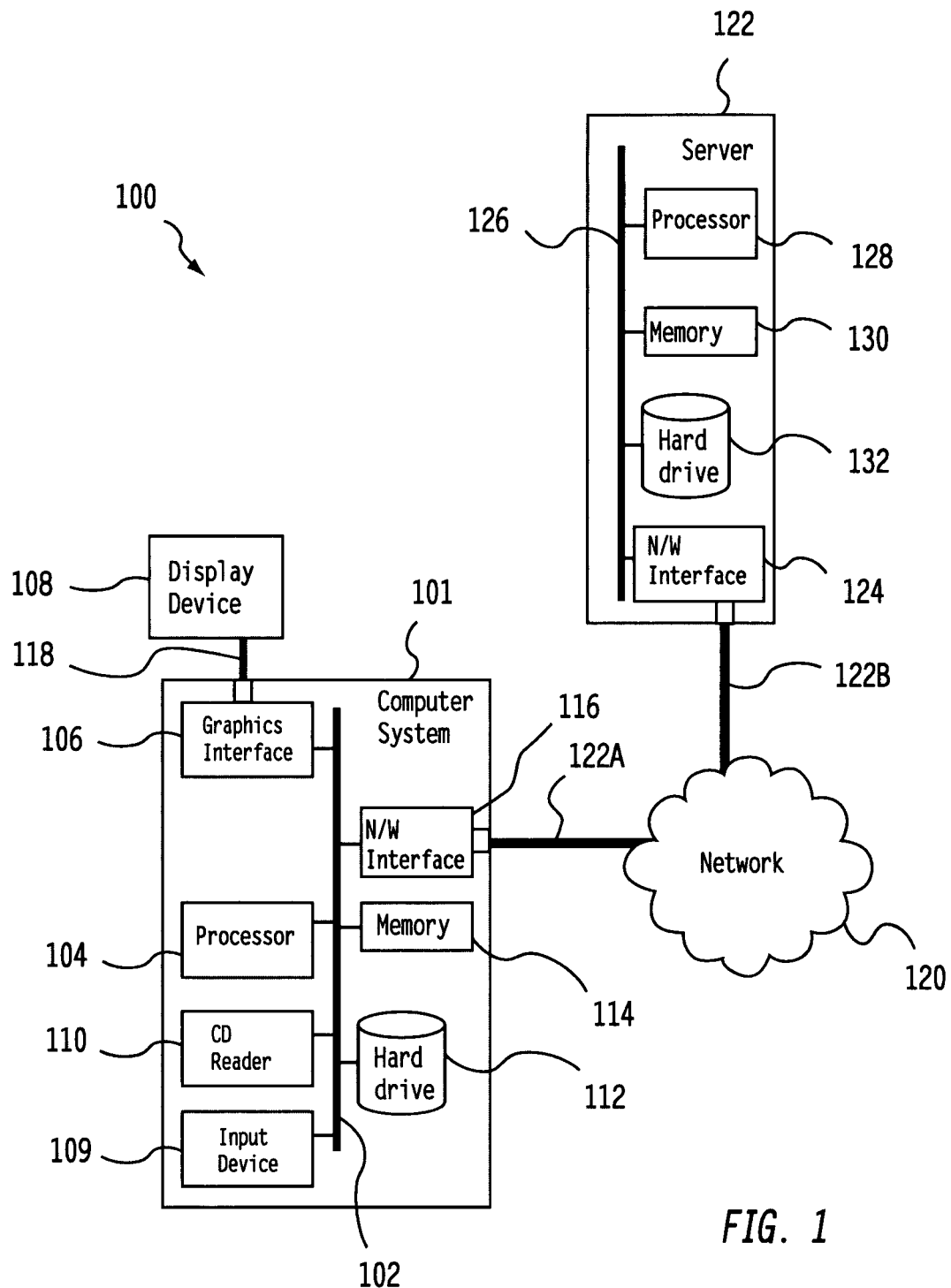
FIG. 1 is a block diagram of an exemplary computer system in which embodiments of the present invention may be advantageously implemented.

FIG. 1 illustrates a simplified exemplary networked computer environment 100 in which embodiments of the present invention may be implemented. It should be noted that networked computer environment 100 of FIG. 1 is a simplified diagram provided for exemplary purposes only, and in actual implementation may comprise various additional or alternative components.

As illustrated, networked computer environment 100 comprises a computer system 101, a network 120, and a server 122. Computer system 101 comprises a bus interface 102 coupled with various components such as, for example, a processor 104, a graphics interface 106, an input device 109, a compact disc (CD) reader 110, a hard drive 112, a volatile memory 114, and a network interface 116. It should be noted that bus interface 102 is but one example of an exemplary communication pathway that may be used for interconnecting the various components of computer system 101, and in other embodiments other communication pathways, now known or future developed, may be used to interconnect the various components of computer system 101. Further, as illustrated, a display device 108 may be connected to graphics interface 106 via display connector 118. It should be appreciated that in actual implementation computer system 101 may comprise various additional or alternative components. Further, it should be appreciated that use of the term computer system is not to be construed as limiting in any way, and that embodiments of the present invention may be implemented in any user-interactive electronic system now or later developed.

Processor 104 may be, for example, any type of processor capable of performing calculations and/or instructions, among many other tasks, and may be, for example, a commercially available central processing unit (CPU). Graphics interface 106 provides a mechanism for transferring or managing display device 108, and may be, for example, a commercially available graphics card. Display device 108 may be, for example, a commercially available display, such as, for example, a cathode ray tube (CRT) or Liquid Crystal Display (LCD) computer monitor. CD reader 110 may be any type of device capable of retrieving and/or storing data to and from CDs, such as Read Only CDs, read/write CDs, etc. It should be noted that CD reader 110 is but one example of a device capable of reading and/or storing data to removable media, and in actual implementation other types of readers may be used in addition to or in place of CD reader 110, such as for example, a Digital Versatile Disk (DVD) reader or read/writer, removable USB storage, a magnetic media reader or read/writer, etc.

Hard drive 112 provides non-volatile storage for data, and may be, for example, any type of non-volatile storage medium, such as, for example a commercially available internal or external hard drive. Volatile memory 114 provides temporary storage for data and may be, for example, random access memory (RAM). Network interface 116 provides connectivity between computer system 101 and network 120 via a network connection 122A, and may be for example, a commercially available network interface card implementing any suitable network protocol, such as, for example, Ethernet, FDDI, etc.

Input device 109 may be, for example, one or more of a multitude of user input devices now known or later developed, such as a keyboard, mouse, stylus, jog dial, touchpad, touch screen, or others. For example, input device 109 may be a keyboard, which may be used to provide text input; a mouse, which may be used to point to and select objects on display device 108 (e.g., by depressing one or more buttons on the mouse when a screen cursor is positioned over a screen object); a stylus, which may be used to point to, draw and select objects on a display (e.g., by pressing the stylus near or against a calibrated sensor surface on display device 108); a jog dial, which may be used to navigate and select objects arranged in a defined sequence or selection path/circuit (e.g., by depressing a jog dial that is configured to accept depressions of the jog dial in addition to navigational turning motions of the jog dial); or a touchpad or touch screen, which has sensors on the pad or screen to detect contact on the pad or screen, may be used to navigate and select objects to as user input.

Input device 109 may also be a bi-directional communication device, where signals from computer system 101 may be communicated to a user of input device 109 using signals from computer system 101 to input device 109 that will trigger the creation and communication of tactile stimuli by input device 109 to the user. Such bi-directional communication input device 109 includes devices such as controllers or joysticks or computer mice which are equipped to provide "force feedback". Tactile stimuli from input device 109 equipped to produce tactile stimuli may be produced in the form of vibrations, buzzing, jerking or other physical movements.

Further, as illustrated in FIG. 1, networked computer environment 100 includes a server 122. Server 122 comprises a bus 126, a processor 128, a memory 130, a hard drive 132 and a network interface 124. The illustrated components of server 122 may be, for example, similar in function as similarly named components in computer system 101. It is to be understood that server 122 may comprise various additional components in addition to or in place of those illustrated.

Network 120 shown in FIG. 1 is depicted as a cloud, signifying that computer system 101 and server 122 may be interconnected through one or more computer networks via a network connection 122B, each implementing a common or multiple different protocols. Further, network 120 may comprise, for example, a local area network (LAN), a wide area network (WAN) or other types of networks, including the Internet. Although FIG. 1 depicts computer system 101 in networked computer environment 100, it is to be understood that the present invention may be embodied or performed in a computer system 101 which is not in a networked environment or otherwise connected to other computers.

As noted above, in this exemplary application of a computer system 101, display device 108 will be used to graphically present guidance information to a user of the system. The guidance information, which is displayed in accordance with a first animation mode, instructs, prompts, suggests or otherwise communicates information to the user resulting in user input. In this exemplary application, such user input is provided via input device 109. The user is alerted to invalid user inputs by altering the animation mode of the displayed guidance information.

Figure 2A:
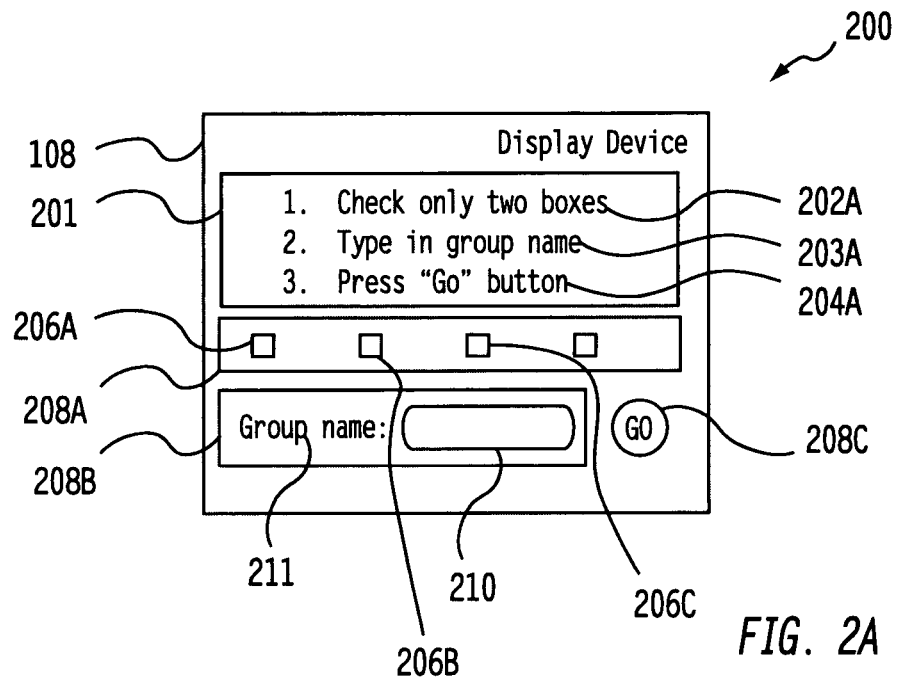
FIG. 2A is an orthogonal view of a display on which guidance information is displayed in an initial animation mode, in accordance with an embodiment of the present invention.

FIG. 2A illustrates an exemplary display 200 presented on display device 108 (FIG. 1). Display 200 contains guidance information 202A, 203A and 204A presented in accordance with the same initial animation mode. That is, guidance information 202A, 203A and 204A are presented with the same static attributes (for example, the same font, font style, font size, and font color, etc., as well as the same dynamic attributes (motion, fading, etc.). In this particular example, guidance information 202A, 203A and 204A are grouped together in an instruction group 201 and address all of the user inputs requested on this display.

Also included in display 200 are various user input display regions 208A, 208B and 208C (collectively referred to as user input display region 208) for receiving input from a user. Input display region 208A comprises a series of checkboxes 206A, 206B, 206C and 206D. User input display region 208B comprises an input text field 210 and an associated label 211. Input display region 208C comprises a graphical button that the user must select for the data entered into user input display regions 208A and 208B to be processed. Although in this exemplary embodiment user input display regions 208 contain checkboxes, text fields and buttons, it should be apparent to those of ordinary skill in the art that embodiments of the present invention may be implemented in connection with other user input mechanisms now known or later developed. Such user input mechanisms include, for example, graphical selection of radio buttons, "click and drag" operations, "drag and release" operations, selection of items on drop down menus, and so on.

Figure 2B:
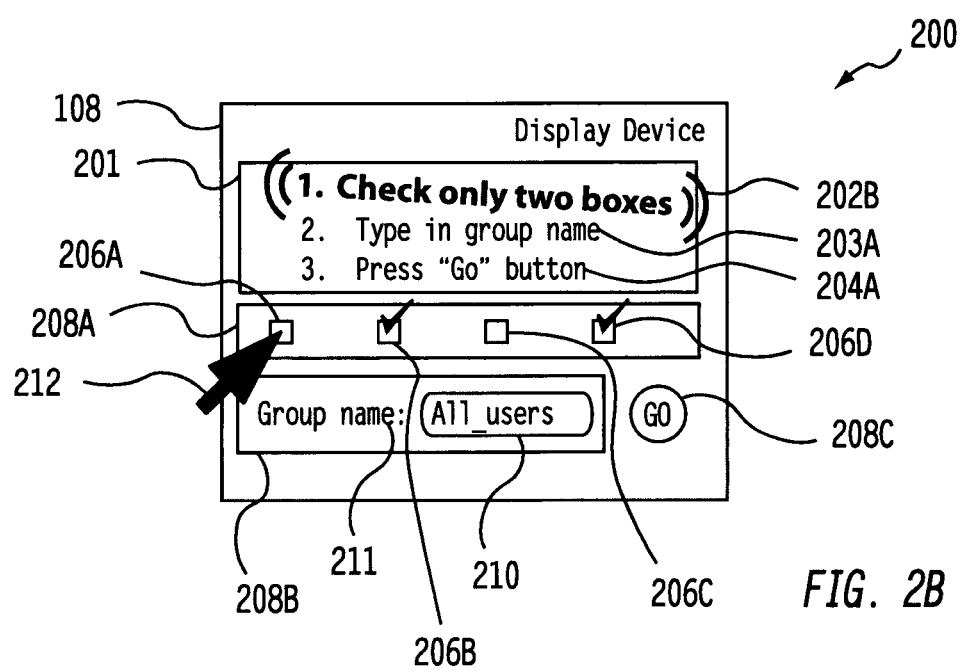
FIG. 2B is an orthogonal view of the display illustrated in FIG. 2A, with certain guidance information displayed in an initial animation mode and other guidance information displayed in an altered animation mode, in accordance with an embodiment of the present invention.

FIG. 2B is an orthogonal view of display 200 after the user has selected the GO button 208C and an embodiment of the present invention determined that the user has entered an invalid user input. Embodiments of this determination operation are described in detail elsewhere herein. In response to this determination, embodiments of the present invention will cause the user instruction corresponding to the invalid user input to be displayed in an altered animation mode to bring attention to the instruction.

Specifically, in this example, instruction 202A recites "1. Check only two boxes" indicating that the user is only to check two of the four checkboxes 206A-206D. As shown in FIG. 2B, the user has already checked two checkboxes (206B and 206D) and is attempting to check a third checkbox 206A using a cursor 212. Cursor 212 may be, for example, a pointer displayed on display device 108 for allowing a user to enter a user input via input device 109. Further, the user input indicating that the user is attempting to check a third checkbox 206A may be received due to, for example, the user dwelling pointer 212 over checkbox 206A using an input device 109 (e.g., a mouse) or by the user attempting to select checkbox 206A, such as for example, by pressing a button on the input device (e.g., clicking a left button of a mouse) or by pressing the Enter/Return key on a keyboard.

As will be described in detail below, the validity of the user inputs is determined by comparing the user inputs to predetermined validation criteria established for responses to guidance information 202B. The user input indicating the user selection of checkboxes 206A, 206B and 206D is compared to the appropriate validation criteria, resulting in a determination that the latest user selection of checkboxes 206A is an invalid user input. As used herein the term "criteria" is used to refer to both a single criterion and multiple criterions.

In response, the user instruction 202A reciting "1. Check only two boxes," which was previously displayed in an initial animation mode is displayed in an altered animation mode. In the example illustrated in FIG. 2B, this altered animation mode visually alerts the user to the specific reason the user input in input area 208A is being rejected. Further, as illustrated in FIGS. 2A and 2B, guidance information 203A and 204A are not changed and displayed in a different animation mode because, in the present example, the user has not provided input that violates these instructions. A further description will be provided below providing an exemplary embodiment of an exemplary mechanism for identifying when user input is invalid and which, if any, user instruction(s) are to be presented in an altered animation mode as a result of that identification.

As will be discussed in further detail below, the identification made by processor 104 or 128 whether to alter the animation mode of any instruction in instruction group 201 may be accomplished using pre-determined validation criteria used to validate an input provided by the user. When a user input is deemed invalid according to such validation criteria, any instruction related to the violated validation criteria may have its animation mode altered from an initial animation mode to an altered animation mode in order to alert the user to the input which was deemed invalid so that the user may take corrective or alternative action.

Other visual effects may be implemented in connection with particular animation modes to more strongly alert the user to invalid inputs in alternative embodiments of the present invention. For example, in addition to changing the animation mode of displayed guidance information, the entire screen may be changed visually, such as by temporarily, quickly and successively inverting the colors being displayed on display device 108 to cause one or more screen "flashes." Alternatively, the animation mode of all or a portion of the invalid user input may be altered temporarily, quickly and successively.

In addition to visually alerting the user to an invalid input entered by in response to user instruction 202A by altering the animation mode, aural cues may be enunciated concurrently with user instruction 202B. For example, aural cues may be presented to the user using speakers (not shown) operationally coupled to computer system 101. This may increase the likelihood that the user is alerted to the invalid input. Exemplary aural cues include, for example, a tone or a voice addressing the user instruction, the invalid reply, or combination thereof.

Other non-visual effects for alerting the user may include, for example, force feedback or other tactile stimuli that may be transmitted to the user by input device 109 properly equipped for force feedback, as described previously.

In the exemplary networked computer environment 100 illustrated in FIG. 1, embodiments of the present invention may be implemented in software executing on processor 128. The display commands generated by such software program(s) are provided to display device 106 via graphics interface 106. Further, the software program(s) of the present invention may be stored in, for example, hard drive 112 or memory 114, or a combination thereof, and retrieved by processor 104 for execution by processor 104. Or, for example, the software program(s) may reside or be executed, in part or in whole, remote from computer system 101, such as, for example by server 122. In one embodiment, server 122 may be a web server that provides to computer system 101 a web page containing the guidance information and requests for user input. In such an embodiment, server 122 may determine whether or not to alter the animation mode of any displayed user instruction among instruction group 201 or 301 in response to user inputs provided to server 122 from computer system 101 via network 120. Or, for example, server 122 may provide computer system 101 with a web page including code executable by computer system 101, such as, for example, Java code, that processor 104 of computer system 101 may execute to determine whether or not to change the animation mode of any displayed guidance information. Implementations of the present invention should not be limited in any way to websites, and may be implemented in any application or software involving user inputs in response to or guided by guidance information that are displayed on display device 108.

Figure 3A:
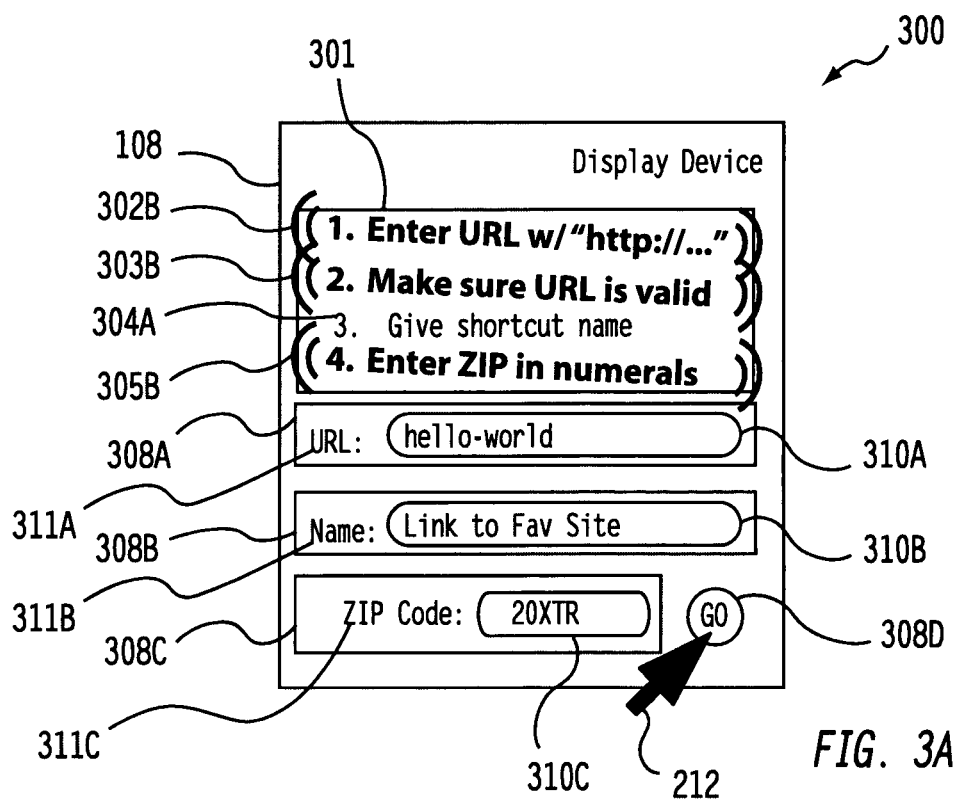
FIG. 3A is an orthogonal view of a display on which certain guidance information is displayed in an initial animation mode and other guidance information is displayed in an altered animation mode, in accordance with an embodiment of the present invention.
Figure 3B:
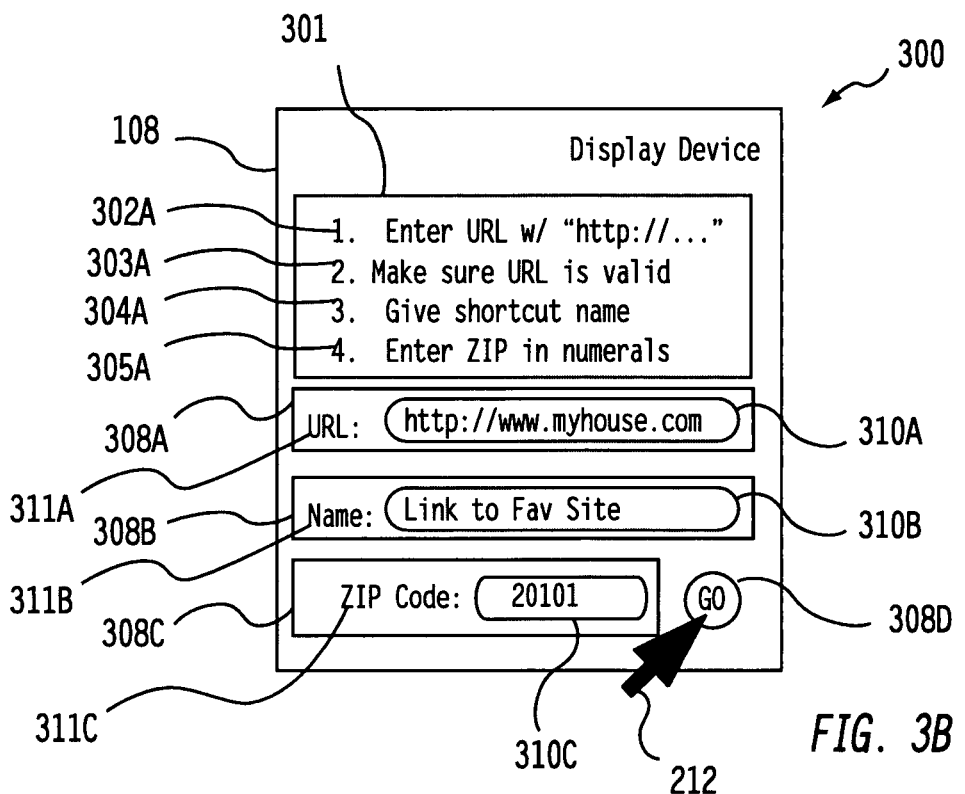
FIG. 3B is an orthogonal view of the display illustrated in FIG. 3A in which the guidance information is displayed in an initial animation mode, in accordance with an embodiment of the present invention.

FIG. 3A is an orthogonal view of a display 300 generated in accordance with another embodiment of the present invention. FIG. 3B is a perspective view of the display illustrated in FIG. 3A in which the guidance information is displayed in an initial animation mode.

Display 300 comprises guidance information 302B, 303B, 304A, 305B. In this example, guidance information 302B, 303B, 304A, 305B are in the form of user instructions and, as such, are collocated in a display box and are collectively referred to as instruction group 301.

User input display region 308A comprises a grouping of an input text field 310A and an input label 311A labeled as "URL:". User input display region 308B comprises a grouping of an input text field 310B and an input label 311B labeled as "Name:". Input display region 308C comprises a grouping of an input text field 310C and an associated text label 311C "ZIP Code:".

User input display region 308D comprises a button that a user may be able to, for example, select or click to request execution of computer code or logic linked to the button.

Although in this exemplary embodiment user input display regions 308 contain checkboxes, text fields and buttons, it should be apparent to those of ordinary skill in the art that embodiments of the present invention may be implemented in connection with other user input mechanisms now known or later developed. Such user input mechanisms include, for example, graphical selection of radio buttons, "click and drag" operations, "drag and release" operations, selection of items on drop down menus, and so on.

In the exemplary display 300 of FIG. 3A, a user of a computer system 101 implementing the present invention has entered text via input device 109 in user input fields 310A and 310B, then clicked via input device 109 on "Go" button 308D, thereby requesting that the user inputs be processed by processor 104 or 128. In this example, the user has entered a web address URL which does not comply with user instruction 302B which requests that the user enter a URL beginning with "http://". Also, in this example, contrary to user instruction 303B requesting a valid URL, the user has entered a non-compliant address for a web site in user input area 308A. Additionally, contrary to user instruction 305B asking for a mailing ZIP code in numeral format, the user has entered "20XTR" in user input area 308C, in this example, which does not comply with user instruction 302C instructing the user to enter the ZIP code in numerals. In this example, because guidance information 302B, 303B and 305B are violated, upon the user selecting "Go" button 308D, guidance information 302B, 303B and 305B are displayed in an altered animation mode while user instruction 304A, which was not violated, remains displayed in an initial animation mode.

As shown in FIG. 3A, in one embodiment of the present invention, when multiple guidance information among instruction group 301 are violated for a single user input, display device 108 will display the multiple guidance information 302B, 303B and 305B that are violated in a different animation mode. For example, in the exemplary display device 108 of FIG. 3A, guidance information 302B and 303B are violated for a single user input area 308A. In that example, display device 108 prompts the user to provide user input in input text field 310A which begins with "http://" and which is a valid web address. The provided input in input text field 310A may be validated according to various methods not shown in FIG. 3A. As a result, multiple guidance information have their animation mode altered from 302A and 303A to 302B and 303B respectively.

In yet another embodiment, display 300 may be presented on display device 108 with selected guidance information displayed in an animation mode that distinguishes or strongly highlights the selected guidance information from the other text or graphics presented in display 300. In one embodiment, the animation mode of such guidance information is changed after, for example, user input starts to be entered via input device 109 or after a pre-set period of time has passed from the time the guidance information were initially displayed.

FIG. 3B illustrates the exemplary display 300 after the user has taken action to correct the invalid user inputs. FIG. 3B is the same as FIG. 3A with the exception that, in this example, the user input in user input text fields 310A and 310C conforms to guidance information 302A, 303A, and 305A. For example, the URL entered by the user in user input text field 310A now begins with "http://", as requested by user instruction 302A, and the website address URL is a valid URL (e.g., http://www.myhouse.com), as requested by user input 303A. Also, the mailing ZIP code in user input text field 310C is now all numerals (e.g., 20101), as requested by user instruction 305A. Upon the user selecting "Go" button 308D, the validity of the new user inputs is determined. When the corrected input is deemed valid, the displaying of guidance information 302A, 303A, and 305A will be changed, for example, from the altered animation mode to an initial animation mode.

In the above embodiments, the determination regarding whether a user input is valid (i.e., conformed to the validation criteria associated with the corresponding guidance information) was described as not occurring until after the user elected to enter the information (e.g., press "Go" buttons 208C or 308D or attempting to check checkboxes 206). It should be understood, however, that in other embodiments the validation operations may performed immediately upon receiving user input, even if the user has not yet elected to enter the input. For example, in the embodiment of FIGS. 2A and 2B, since two checkboxes 206B and 206D were previously selected, in an embodiment, if the user directs pointer 212 over another checkbox (e.g., checkboxes 206A or 206C), such user action may be validated and deemed invalid, causing a change in the animation mode of user instruction 202A to notify the user of a potentially invalid entry if the user attempted to check a third checkbox 206.

Additionally, in yet another embodiment, some user input in a single display (e.g., display 200 or display 300) is validated immediately upon receiving the user input, while other user input is only validated after receiving an explicit election by the user to enter the information, such as when the user clicks a "Submit", "Next", "Accept", "Yes", "Go" or other user input indicating a request to process the information. For example, in FIGS. 2A and 2B, a user input regarding checkboxes 206A, 206B, 206C and 206D may be validated immediately upon moving pointer 212 over a checkbox 206 or the user selecting a checkbox 206 using input device 109 (e.g., pressing the left mouse button when pointer 212 is positioned over a checkbox 206). However, user input provided in input field 210 may not be validated until the user selects "Go" button 208C which is itself a user input, via input device 109.

Figure 4A:
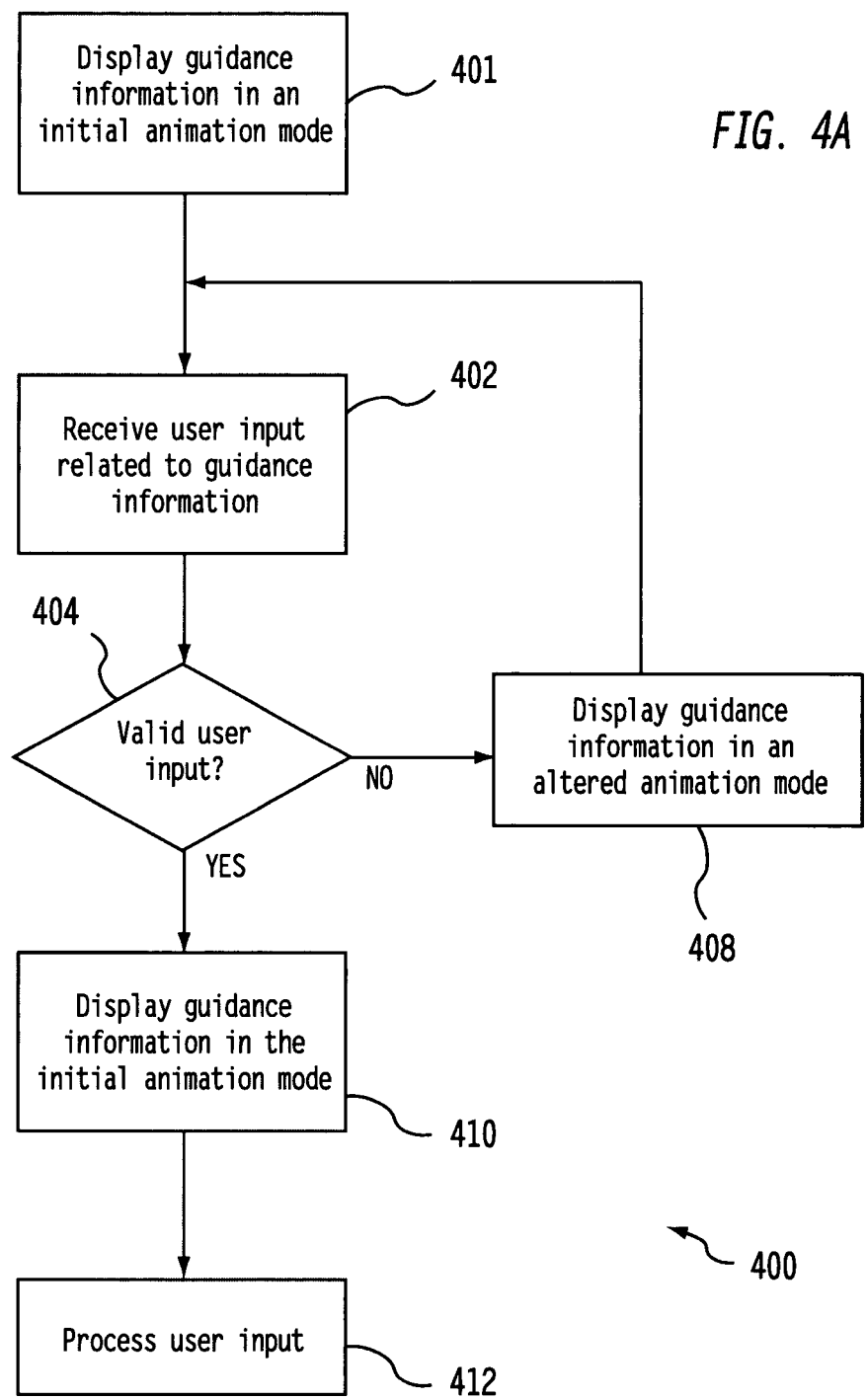
FIG. 4A is a high level flow chart of the operations performed in one embodiment of the present invention.

FIG. 4A is a flow chart of an exemplary method 400 for validating user input and changing the animation mode of violated instruction(s), in accordance with an embodiment of the present invention. For exemplary purposes, FIG. 4A will be described below with reference to the exemplary networked computing environment 100 illustrated in FIG. 1 and described above. At block 401, guidance information in the form of a user instruction is displayed on display device 108 in an initial animation mode. In one embodiment, for example, the user instruction is displayed in accordance with an animation mode that does not emphasize the user instruction relative to the other information concurrently displayed on display device 108.

At block 402, computer system 101 receives a user input related to the displayed user instruction. At block 404, the received user input is validated by determining whether the received user input satisfies predetermined validation criteria established for the user instruction. A further description of exemplary validation criteria and how they may be used to identify invalid user inputs is provided below with reference to FIGS. 5A, 5B and 5C. As noted, this validation may occur immediately upon computer system 101 receiving the user input, such as, for example, immediately after a checkbox is checked by the user. Or, for example, the user input may be validated after one user input is received and then a second user input is received, such as the selection by the user of a "Submit" or "Go".

At block 408, the guidance information relating to the invalid input is displayed in an altered animation mode on display device 108. In one embodiment, for example, the user instruction displayed in the altered animation mode that emphasizes the user instruction relative to the other information or graphics concurrently displayed on display device 108.

The displaying of guidance information in different animation modes (e.g., animated and non-animated) as described above may be accomplished by software executed by processor 104. Further, such software may use, for example, software components of other software such as, for example, commercially available software products. For example, in one embodiment, software may be utilized that uses software components of Microsoft's .NET framework, which includes software tools that may be used for displaying text in various animation modes, including in animated and non-animated modes.

When the user input is determined to be valid at block 404 (i.e., in compliance with the displayed guidance information), then the guidance information is displayed on display device 108 in the initial animation mode. If any guidance information presently displayed on display device 108 were previously displayed at block 408 in the altered animation mode, then, at block 410 that guidance information may have its animation mode changed from the altered animation mode to the initial animation mode at block 410. If the guidance information presently displayed on display device 108 did not have its animation mode changed from the initial animation mode, then at step 410 the guidance information will continue to be displayed in the initial animation mode.

At block 412, further actions or processing of user's input may be triggered after displaying guidance information. For example, the execution of other computer code by processor 104, such as storing or retrieving data based on the input provided by the user, or other actions related or not related to the information received from the user, may occur after the exemplary method 400 according to the present invention.

Although FIG. 4A was described above with reference to processor 104 executing software for performing the above described exemplary steps of FIG. 4A, in other embodiments the above described methods may be performed by processor 128 of server 122, processor 104 of computer system 101, other processors, or any combination thereof. Further, this exemplary software may be stored by any storage medium, such as, for example, hard drive 112, memory 114, memory 130, hard drive 132, or other computer readable mediums, or any combination thereof. Exemplary other computer readable mediums may include CDs, DVDs, or magnetic media. In addition, the operations of the present invention may be performed in hardware, firmware, or any combination of hardware, software and firmware.

Figure 4B:
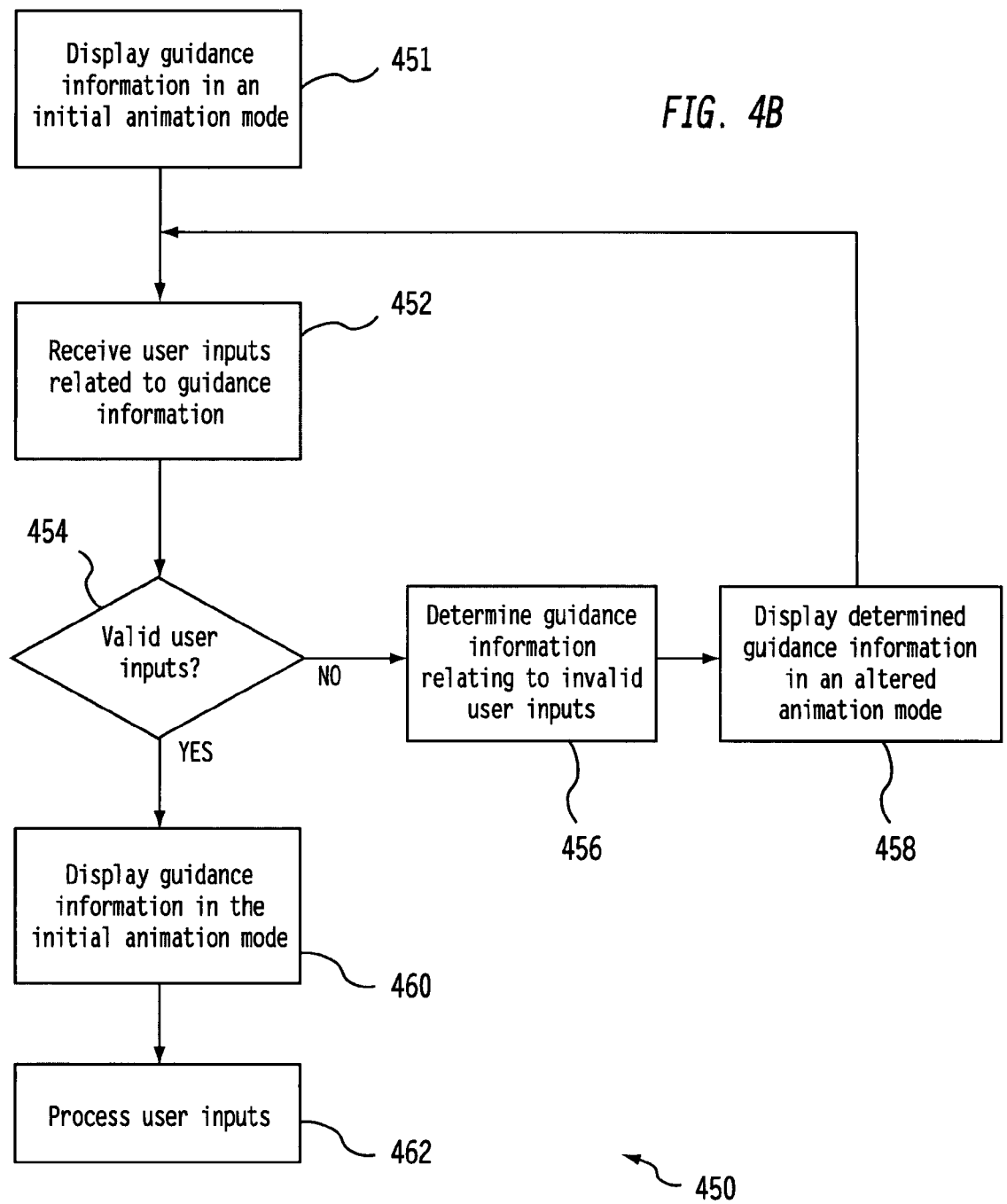
FIG. 4B is a high level flow chart of the operations performed in another embodiment of the present invention.

FIG. 4B is a flow chart of another exemplary method 450 for validating user inputs in response to multiple guidance information, and changing the animation mode of violated user instruction(s), in accordance with an embodiment of the present invention. The operations illustrated in FIG. 4B may be similar to those described above with reference to FIG. 4A, except that the exemplary operations in FIG. 4B includes displaying multiple guidance information, receiving multiple user inputs, and highlighting multiple violated guidance information. That is, blocks 451, 452, 454, 458, 460, and 462 of FIG. 4B may function in substantially same manner, but with the above-noted exceptions, as similarly named blocks 401, 402, 404, 408, 410, and 412 of FIG. 4A. At block 456, if multiple guidance information relates to one of several user input fields (e.g., guidance information 302B and 303B of FIG. 3A), processor 104 identifies which of the guidance information displayed at step 401 should be changed from the initial animation mode to the altered animation mode.

FIGS. 5A, 5B and 5C illustrate exemplary tables including validation criteria in accordance with embodiments of the present invention. It is to be understood that the tables shown in FIGS. 5A, 5B, and 5C are exemplary and other types, configuration and composition of tables may be used in conjunction with or in place of the illustrated tables, without departing from the present invention. FIG. 5A provides an input definition table 500 comprising a column for a name ("input_name" column 510) for the input or related data, a type ("input_type" column 512) of the user input, a maximum input length ("input_len" column 514) for the user input, and a Boolean value for use in defining whether a particular input will be required ("required" column 516) from the user. For example, as illustrated, the first four rows of table 500 may correspond to the checkboxes illustrated in FIGS. 2A and 2B, where the input name 510 "Bx1" corresponds to checkbox 206A, "Bx2" corresponds to checkbox 206B, "Bx3" corresponds to checkbox 206C, and "Bx4" corresponds to checkbox 206D, and where the input type 512 for each checkbox is identified in table 500 as "T/F" indicating that the checkbox may either be checked ("T") or not checked ("F") by user input, and the input length 514 for each is 1 character, and that no user input is required for this input type as indicated by the entry "0" in the required column 516. Similarly, input name 510 "GrpNum" may correspond to input text field 210 of FIGS. 2A and 2B, and the input type 512 for thus expected user input is identified in table 500 as "char" indicating that the expected user input is character data, and the input length 514 for this user input may comprise up to 50 character, and that user input is required for this input type as indicated by the entry "1" in required column 516.

FIG. 5B illustrates an exemplary validation table 502 that may comprise columns that may be used to store logic used to validate the input received from the user. As shown, validation table 502 comprises columns such as a unique identifier ("id" column 520) for each validation rule, a name for each validation rule ("verify_name" column 522), an identification of the names for which user inputs the corresponding validation criteria in validation table 502 is to be applied ("applies_to" column 524), the validation criteria ("rule" column 526), and information which establishes a relationship with a particular validation criteria and the input which it is intended to be used for ("instr_link" column 528). For example, as illustrated the first four rows of validation table 502 correspond to the input names "Bx1," "Bx2," "Bx3," and "Bx4" of input definition table 500, as indicated by their entries in the applies to column 524. Further, the validation rule for each of these four user inputs is defined in the rule column 526 as computing a sum of the user inputs for each of these checkboxes to determine if the sum of the number of checkboxes check is less than 3 ("Sum(Bx1,Bx2,Bx3,Bx4)<3) and this rule is named "Sum_checked_box" as indicated by the entry in verify name column 522. Further, as indicated by the entry for each of these rows in the instr_lnk column, the displayed user instruction being violated if this rule is violated is identified as "Instr1," which in this example represents the displayed user instruction "check only two boxes" 202 of FIGS. 2A and 2B.

Accordingly, as evidenced by the exemplary entries in tables 500 and 502, relationships between a particular received user input to be validated and the validation criteria to be used for validating the user input may be, for example, defined by using columns such as "applies_to" 524 and "input_name" 510. Further, as illustrated, a single user input may be defined to be validated using multiple validation criteria. For example, in validation table 502, "GroupNm" has two validation criteria defined for validating input identified as "GroupNm" in table 500. For example, as illustrated, "GroupNm" user input is valid only if it meets both the rule "Len(GroupNm)<50" and the rule "Len(GroupNm)>0" in rule column 526 meaning that the user input entered in input text field 210 of FIGS. 2A and 2B must be greater than 0 characters and less than 50 characters for the user input to be deemed valid. Although not illustrated in table 502, in embodiments, a single validation criteria may be used to validate multiple user inputs.

FIG. 5C illustrates an exemplary animation definition table 504 providing information which defines one or more animation modes, for example, an altered animation mode. The information in animation definition table 504 on how guidance information are to be displayed in an animation mode when, for example, validation criteria is not met at step 404 for user input received at step 402 of FIGS. 4A and 4B, and therefore deemed invalid. As shown, animation definition table 504 comprises columns such as a unique animation identifier ("actionID" column 530), a column providing links ("instr" column 532) to one or more guidance information (e.g., 201, 301) displayed on display device 108, and animating instructions ("action" column 534) which may be used by software code which is used to display guidance information in a altered animation mode. In embodiments where multiple animation actions are to be taken on a single user instruction, animation definition table 504 may comprise multiple rows, one row for each animation action. For example, in the embodiment illustrated in FIG. 5C, the first four rows of animation definition table 504 may be used as an altered animation mode to animate the instruction "instr_1", which as noted above corresponds to the displayed user instruction 202 ("1. Check only two boxes.") of FIGS. 2A and 2B. Further, as illustrated by the corresponding entries in action column 534, if this user instruction is violated the displayed instruction will be modified to change its font size, color, bouncing motion and rotational position. In addition to storing information on how to animate a particular instruction, animation definition table 504 or other tables may be used to store additional information to be used to prompt the user for valid input or to further alert the user of invalid input, including storing information on non-visual alerting methods such as aural cues or force feedback, among others, as noted above.

It should be noted that the tables illustrated in FIGS. 5A, 5B, and 5C, are exemplary only, and other mechanisms or tables may be used for determining whether a particular user input is valid and how to animate a corresponding instruction based on whether the user input is deemed valid or invalid. For example, in other embodiments, object oriented programming methods, such as, for example, using objects, may be used for validating received user inputs and changing the animation mode of violated guidance information may be used without departing from the present invention. Or, for example, the validation criteria and/or how to change the animation mode for a particular user instruction may be implemented using computer code that incorporates validation criteria in addition to displaying guidance information and receiving user input. It should be noted that these are exemplary mechanisms for implementing validation criteria and in other embodiments other mechanisms may be used for employing validation criteria without departing from the present invention.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A method for bringing user attention to a region of a display containing guidance information, comprising:
  displaying, by a computer, a plurality of user input display regions for receiving user input;
  displaying, by the computer, a plurality of guidance instructions in an initial animation mode, wherein the plurality of guidance instructions correspond to the plurality of user input display regions;
  receiving, by the computer, the user input in the user input display regions in according to said displayed plurality of guidance information instructions;
  determining, by the computer, whether said user input in the user input display regions satisfies corresponding validation criteria; and
  in response to determining that the user input in any particular one or more of the user input display regions fails to satisfy one or more of the corresponding validation criteria, displaying one or more of the guidance instructions corresponding to the particular one or more user input display regions in one or more altered animation modes.

2. The method of claim 1, further comprising:
  receiving second user input subsequent to displaying the corresponding one or more guidance instructions in said one or more altered animation modes;
  determining whether said second user input satisfies said validation criteria for responses to said guidance instructions; and
  displaying said guidance instructions in said initial animation mode in response to determining that said second user input satisfies said validation criteria for responses to said guidance instructions.

3. The method of claim 1, wherein said receiving the user input according to said displayed guidance instructions comprises:
  receiving the user input in response to a user touching a touch screen display device.

4. The method of claim 1, wherein displaying the corresponding one or more guidance instructions in the one or more altered animation modes comprises:
  displaying plural ones of the guidance instructions in corresponding plural different altered animation modes.

5. The method of claim 4, wherein each of the plural different altered animation modes is selected from the group consisting of:
  an animation mode in which a guidance instruction is moving, an animation mode in which a guidance instruction is growing and/or shrinking, and an animation mode in which a graphic is moving.

6. The method of claim 4, further comprising:
  in response to determining that the user input in any particular one or more of the user input display regions fails to satisfy one or more of the corresponding validation criteria, activate a force feedback including physical movement of a user input device for alerting a user.

7. The method of claim 4, further comprising storing information describing a first altered animation mode for a first of the guidance instructions, and describing a second altered animation mode for a second of the guidance instructions, wherein the first and second altered animation modes are different, and wherein the first and second altered animation modes are included in the plural different altered animation modes.

8. The method of claim 1, wherein the plurality of user input display regions and the plurality of guidance instructions are displayed concurrently.

9. A system for bringing attention to a region of a display containing guidance information comprising:
   a display device;
   a user input device operatively coupled to said display; and
   a processor configured to:
   display a plurality of user input display regions for receiving user input;
   display a plurality of guidance instructions in an initial animation mode on said display device, wherein the plurality of guidance instructions correspond to the plurality of user input display regions;
   receive user input, from said user input device, in the user input display regions in response according to said displayed plurality of guidance instructions;
   determine whether said user input satisfies corresponding validation criteria; and
   in response to determining that the user input in any particular one or more of the user input display regions fails to satisfy one or more of the corresponding validation criteria, display on said display device one or more of the guidance instructions corresponding to the particular one or more user input display regions in one or more altered animation modes.

10. The system of claim 9, wherein said processor is further configured to:
    receive second user input subsequent to displaying the corresponding one or more guidance information instructions in said one or more altered animation modes;
    determine whether said second user input satisfies said validation criteria for responses to said guidance instructions; and
    display said guidance instructions in said initial animation mode in response to determining that said second user input satisfies said validation criteria for responses to said guidance instructions.

11. The system of claim 9, wherein said display device comprises a touch screen display device configured to receive said user input in response to a user touching said touch screen display device.

12. The system of claim 9, wherein displaying the corresponding one or more guidance instructions in the one or more altered animation modes comprises:
    displaying plural ones of the guidance instructions in corresponding plural different altered animation modes.

13. The system of claim 12, wherein each of the plural different altered animation modes is selected from the group consisting of:
    an animation mode in which a guidance instruction is moving, an animation mode in which a guidance instruction is growing and/or shrinking, and an animation mode in which a graphic is moving.

14. The system of claim 12, wherein said processor is configured to further store information describing a first altered animation mode for a first of the guidance instructions, and describing a second altered animation mode for a second of the guidance instructions, wherein the first and second altered animation modes are different, and wherein the first and second altered animation modes are included in the plural different altered animation modes.

15. The system of claim 9, wherein said processor is configured to further cause activation of a force feedback including physical movement of the user input device, in response to determining that the user input in any particular one or more of the user input display regions fails to satisfy one or more of the corresponding validation criteria.

16. The system of claim 9, wherein the processor is configured to display the plurality of user input display regions and the plurality of guidance instructions concurrently.

17. A non-transitory computer-readable medium storing a computer executable program comprising code which when executed by a computer implements a method comprising:
    displaying a plurality of user input display regions for receiving user input;
    displaying a plurality of guidance instructions in an initial animation mode, wherein the plurality of guidance instructions correspond to the plurality of user input display regions;
    receiving the user input in the user input display regions in response according to said displayed plurality of guidance instructions;
    determining whether said user input in the user input display regions satisfies validation criteria for responses to said guidance instructions; and
    in response to determining that the user input in any particular one or more of the user input display regions fails to satisfy one or more of the corresponding validation criteria, displaying one or more of the guidance instructions corresponding to the particular one or more user input display regions in one or more altered animation modes.

18. The non-transitory computer-readable medium of claim 17, wherein said method further comprises:
    receiving second user input subsequent to displaying the corresponding one or more guidance instructions in said one or more altered animation modes;
    determining whether said second user input satisfies said validation criteria for responses to said guidance instructions; and
    displaying said guidance instructions in said initial animation mode in response to determining that said second user input satisfies said validation criteria for responses to said guidance instructions.

19. The non-transitory computer-readable medium of claim 17, wherein receiving the user input in response to said displayed guidance instructions comprises:
    receiving the user input in response to a user touching a touch screen display device.

20. The non-transitory computer-readable medium of claim 17, wherein displaying the corresponding one or more guidance instructions in the one or more altered animation modes comprises:
    displaying plural ones of the guidance instructions in corresponding plural different altered animation modes.

21. The non-transitory computer-readable medium of claim 20, wherein each of the plural different altered animation modes is selected from the group consisting of:
    an animation mode in which a guidance instruction is moving, an animation mode in which a guidance instruction is growing and/or shrinking, and an animation mode in which a graphic is moving.

22. The non-transitory computer-readable medium of claim 20, wherein the method further comprises:
    storing information describing a first altered animation mode for a first of the guidance instructions, and describing a second altered animation mode for a second of the guidance instructions, wherein the first and second altered animation modes are different, and wherein the first and second altered animation modes are included in the plural different altered animation modes.

23. The non-transitory computer-readable medium of claim 17, wherein the method further comprises:
  in response to determining that the user input in any particular one or more of the user input display regions fails to satisfy one or more of the corresponding validation criteria, cause activation of a force feedback including physical movement of a user input device for alerting a user.

24. The non-transitory computer-readable medium of claim 17, wherein the plurality of user input display regions and the plurality of guidance instructions are displayed concurrently.

* * * * *

UNITED STATES PATENT AND TRADEMARK OFFICE
CERTIFICATE OF CORRECTION

Page 1 of 1

PATENT NO. : 8,984,403 B2
APPLICATION NO. : 11/790869
DATED : March 17, 2015
INVENTOR(S) : Oluf Nissen et al.

It is certified that error appears in the above-identified patent and that said Letters Patent is hereby corrected as shown below:

In the Drawings

In sheet 6 of 6, reference numeral 522, line 1, delete "Verif" and insert -- Verify --, therefor.

In the Claims

In column 12, line 14, in Claim 1, delete "regions in" and insert -- regions --, therefor.

In column 12, line 15, in Claim 1, delete "information instructions" and insert -- instructions --, therefor.

In column 13, line 16, in Claim 9, delete "regions in response" and insert -- regions --, therefor.

In column 13, line 30, in Claim 10, delete "guidance information" and insert -- guidance --, therefor.

In column 14, lines 16-17, in Claim 17, delete "regions in response" and insert -- regions --, therefor.

Signed and Sealed this
Fourth Day of August, 2015

Michelle K. Lee
*Director of the United States Patent and Trademark Office*